April 24, 1928.
C. H. BROWN
FOOT MEASURING APPARATUS
Filed Aug. 3, 1925
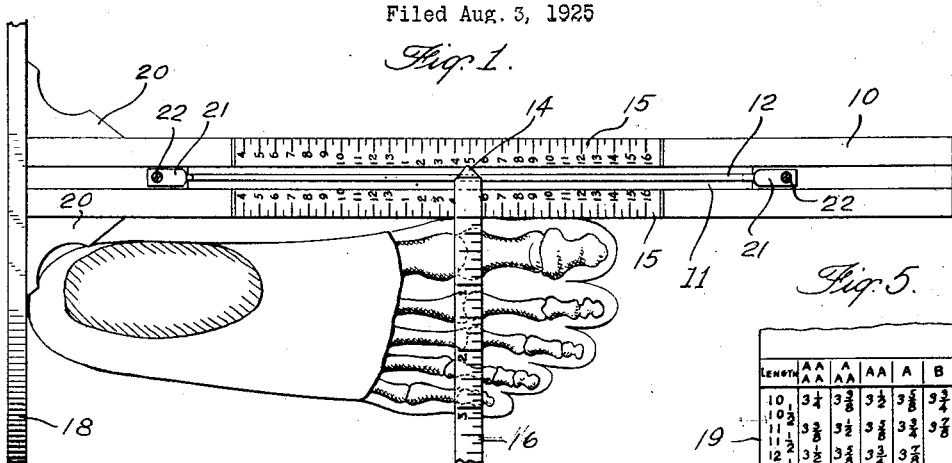
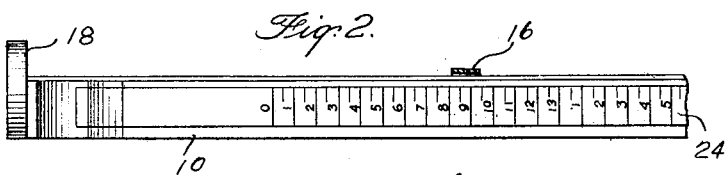
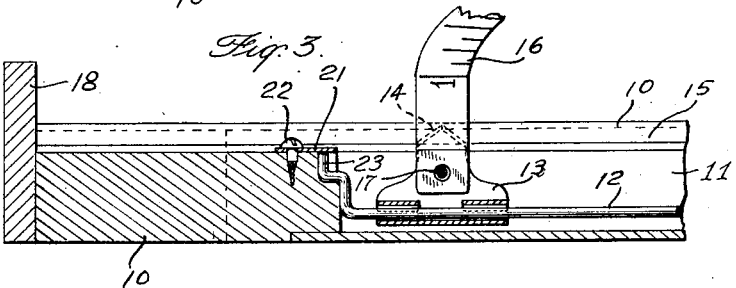
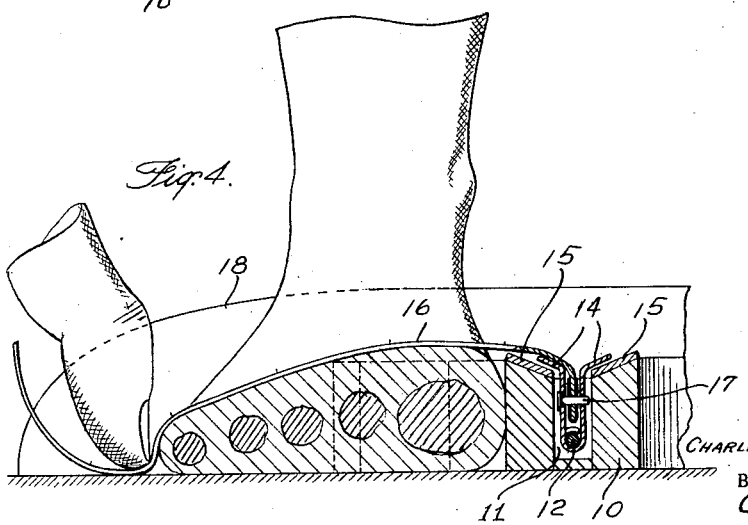
INVENTOR
Charles H. Brown.
BY
ATTORNEY Patented Apr. 24, 1928.

1,667,100

UNITED STATES PATENT OFFICE.

CHARLES H. BROWN, OF FLUSHING, NEW YORK.

FOOT-MEASURING APPARATUS.

Application filed August 3, 1925. Serial No. 47,766.

Among the principal objects which the present invention has in view are: To facilitate the operation of measuring the feet of a person being fitted with shoes; to accommodate the apparatus for measuring both feet of the person being fitted; to provide measuring devices for locating the joints of the foot and the disposition of the transverse measurements; and to simplify the construction of the apparatus.

Drawings:

Figure 1 is a top plan view of an apparatus constructed and arranged in accordance with the present invention;

Figure 2 is a side edge view thereof;

Figure 3 is a detail view on enlarged scale, showing the method of constructing and mounting the index point and the attachment thereof to a flexible measuring device employed in the apparatus;

Figure 4 is a transverse section, showing pictorially the manner of employing the apparatus;

Figure 5 is a view of the printed table on the under side of the length rule for translating the measurements obtained to the standard symbol.

As seen in the drawings the apparatus embodies a two-edged length rule 10. Lenthwise and centrally extended in said length rule is a groove 11. In the groove 11 is permanently mounted a slide rod 12. Slidably mounted on the rod 12 is a double-ended index 13, the indicating points 14 whereof rest over and in relation to the calibrated scale 15. Between the walls of the index 13 is anchored the end of a flexible tape measure 16, the anchorage being provided by a pin 17. It will be seen that when the foot of the person being measured is placed beside the rule 10 so as to touch the rule the juxtaposed calibrations will indicate the distance of any joint on the foot or, if desired, the end of the toe from the base board 18 against which the heel is pressed.

Having determined to make the measurements across the foot in line with the joint of the great toe, the index 13 is slidably moved on the rod 12 to the point where the point 14 registers with the number on the calibrations or scale 15, opposite the said joint. The tape measure is then drawn to one side as seen best in Figures 1 and 4 across the foot to be pressed down upon the floor or stand upon which the foot rests at the opposite side of the foot. Other measurements of other parts of the foot may be taken if desired, but, as a general rule, the two measurements, i. e. the length of the foot from the back of the heel to the joint of the big toe and the measurement across what is known as the metatarsal arch are the controlling features of the measure of a shoe.

It will be noted that the measurement thus taken with the tape measure 16 is ascertained in inches, whereas the widths of the shoes are commonly known by symbols such as AA, A, and B, etc. Therefore, the salesman to know the symbol after measuring in inches will consult the scale on the under side of the rule 10 where he will find the inch measurements for the various length sizes in columns headed by the symbol to which the said measurements belong with reference to the lengths ascertained. He can therefore give to the purchaser terms understood by the purchaser.

In order to obtain the correct position of the foot when measuring the width thereof I provide corner blocks 20 against which the heel of the person presses, and which heel is removed from the side of the rule. This sets what might be termed the direction of the foot with reference to the rule, so that the tape measure 16 extends perpendicularly from the rule when making the width measurements.

The sliding rod 12 is held in position in the rule 10 by means of small cap plates 21. The plates 21 are held in position by means of screw fasteners 22. The ends 23 of the rod 12 are bent outward as shown in Figure 3 of the drawings to fit recesses in the ends of the groove 11 provided therefor.

In the system of measuring feet where the length between the back of the heel and the joint of the great toe is taken, a difference is established from the old standard, where the length of the foot was taken from the back of the heel to the tip of the toe. In order that the two systems may be ascertained simultaneously I have provided on the side of the rule 10 a calibrated scale 24. By means of this scale the length of the foot may be noted as per·the old or standard system and the customer may be informed with reference thereto in the terms with which he has become familiar.

Claim:

An apparatus as characterized having a base board laterally extended for engaging the heels of both feet of a customer at the same time; an elongated rule mounted midway thereon in perpendicular disposition thereto, said rule having a longitudinally disposed groove and calibrated edges at the opposite sides of said groove, the calibrations being disposed to assist in locating the position of the structural features of both right and left feet at approximately the same time, and particularly of the joints of the great toes thereof; a slidable index mounted in said groove and having pointing members for registering with the calibrations on said edges; and a flexible measuring member mounted in said index adapted for measuring the width of the feet at opposite sides of said rule without moving said rule.

CHARLES H. BROWN.